(12) United States Patent
Elias et al.

(10) Patent No.: US 10,009,228 B2
(45) Date of Patent: Jun. 26, 2018

(54) AUTOMATED VALIDATION OF CONTRACT-BASED POLICIES BY OPERATIONAL DATA OF MANAGED IT SERVICES

(71) Applicant: International Business Machines Corporation, Armonk, NY (US)

(72) Inventors: Guilherme S. Elias, Sumare (BR); Marcos V. Paraiso, Campinas (BR); Marcos D. Sylos, Campinas (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 13/929,884

(22) Filed: Jun. 28, 2013

(65) Prior Publication Data
US 2015/0006693 A1    Jan. 1, 2015

(51) Int. Cl.
*G06F 15/173* (2006.01)
*H04L 12/24* (2006.01)

(52) U.S. Cl.
CPC ...... *H04L 41/0893* (2013.01); *H04L 41/0873* (2013.01)

(58) Field of Classification Search
CPC . H04L 41/0893; H04L 12/24; H04L 41/0213; H04L 29/08072; H04L 29/06; H04L 41/22; H04L 41/12
USPC .......................................................... 709/223
See application file for complete search history.

(56) References Cited

U.S. PATENT DOCUMENTS

| | | |
|---|---|---|
| 6,523,166 B1 | 2/2003 | Mishra et al. |
| 7,392,430 B2 | 6/2008 | Greenlee et al. |
| 7,496,910 B2 | 2/2009 | Voskuil |
| 8,024,608 B2 | 9/2011 | Greenlee et al. |
| 8,260,893 B1 | 9/2012 | Bandhole et al. |
| 8,276,152 B2 | 9/2012 | Sanghvi et al. |
| 8,276,161 B2 | 9/2012 | Cole et al. |
| 2003/0236745 A1* | 12/2003 | Hartsell ............... G06Q 20/102 705/40 |
| 2004/0243699 A1* | 12/2004 | Koclanes ................ H04L 29/06 709/224 |

(Continued)

OTHER PUBLICATIONS

Aib et al., "Business Aware Policy Based Management", 2006, 12 pps., <http://www.hpl.hp.com/personal/Claudio_Bartolini/download/bdim06.pdf>.

(Continued)

*Primary Examiner* — Vivek Srivastava
*Assistant Examiner* — Hermon Asres
(74) *Attorney, Agent, or Firm* — Daniel R. Simek (57) ABSTRACT

One or more processors validate consistency between a policy-based service and operational data of a managed IT environment. One or more processors collect information for a component of a baseline, wherein the component of the baseline is at least one of an IT device and an application within the managed IT environment. One or more processors determine the policy-based service to be applied to the component of the baseline. One or more processors collect information to access operational data associated with a provider of the policy-based service. One or more processors generate a policy based on the information for the component of the baseline and the policy-based service to be applied to the component of the baseline, and one or more processors perform a validation of consistency based on a comparison between the policy and the operational data associated with the provider of the policy-based service.

20 Claims, 5 Drawing Sheets

(56) References Cited

U.S. PATENT DOCUMENTS

| | | | |
|---|---|---|---|
| 2006/0174320 | A1 | 8/2006 | Maru et al. |
| 2008/0104661 | A1 | 5/2008 | Levin et al. |
| 2009/0172769 | A1 | 7/2009 | Bobak et al. |
| 2010/0064184 | A1* | 3/2010 | Almeida ............ H04L 41/5003 714/57 |
| 2010/0153377 | A1 | 6/2010 | Rajan et al. |
| 2010/0268528 | A1* | 10/2010 | Raskina ................ G06F 17/277 704/9 |
| 2011/0289588 | A1* | 11/2011 | Sahai .................... G06Q 90/00 726/25 |
| 2012/0271937 | A1 | 10/2012 | Cotten et al. |
| 2012/0324072 | A1* | 12/2012 | Sartini ...................... G06F 9/50 709/223 |

OTHER PUBLICATIONS

Agrawal, et al.,"Policy Management for Networked Systems and Applications", Integrated Network Management,.2005. IM 2005. 2005 9th IFIP/IEEE International Symposium Publication Year: 2005, pp. 455-468, Copyright 2005 IEEE, <http://www.research.ibm.com/people/k/kangwon/publications/im05.pdf>.

Kandogan et al., "Policy-based Management of an E-commerce Business Simulation: An Experimental Study", Manuscript received Jan. 29, 2006, pp. 33-42, Copyright 2006 IEEE, <http://ieeexplore.ieee.org/xpls/abs_all.jsp?arnumber=1662379&tag=1>.

"Policy-Based Network Management for Services Automation", Cisco Systems, downloaded Nov. 19, 2011, 16 pps., <http://www.cisco.com/en/US/technologies/collateral/tk869/tk769/white_paper_c11-642029.html>.

* cited by examiner

AUTOMATED VALIDATION OF CONTRACT-BASED POLICIES BY OPERATIONAL DATA OF MANAGED IT SERVICES

BACKGROUND OF THE INVENTION

The present invention relates generally to the field of managed information technology (IT) services and more particularly to validation of consistency between contracted IT services and operational data from an end-to-end perspective.

IT environments are becoming more and more complex. New technologies, product and deployment models make the management of an IT environment difficult to maintain. To more effectively support and maintain an IT environment, many businesses and organizations have dedicated departments with specific service responsibility, or consider outsourcing. Outsourcing is an arrangement in which one company provides services for another company that could also be or usually have been provided in-house. Outsourcing is a trend that is becoming more common in information technology and other industries for services that have usually been regarded as intrinsic to managing a business.

Outsourcing operations and support of a business's or organization's IT environment involves contracting with a managed service provider instead of managing an IT environment internally. Managed services refer to the practice of outsourcing day-to-day management responsibilities as a strategic method for improving operations. The entity that owns or makes use of the systems managed is referred to as the client or customer, whereas the entity that accepts and provides the managed service is regarded as the service provider, which can be an outsourced provider or an internal IT organization. A managed services provider (MSP) is typically an IT services provider that manages and assumes responsibility for providing a defined set of services and in some cases infrastructure, to their clients.

To improve efficiency of managed service efforts and to be in compliance with the services that are to be provided by a service provider, many tools are deployed onto the servers and other devices being managed. The tools in these instances are software programs or software agents that have a specific function to perform tasks, collect data, monitor activity or check the status or state of components within an IT environment. The addition of the tools makes the environment more complex and more resource intensive to maintain. For example, to manage one server at a level defined by a contract or service level agreement, it may require up to 10 separate tools providing monitoring, security, performance, inventory, patching, backup, usage, and other functions or services.

As the complexity of the IT environment increases, service support also increases in response, and may involve added organizational structure. Service support becomes more specialized with respective service groups designated to provide respective services. Due to service providing entities becoming more segmented and specialized, there is a loss of end-to-end or "big picture" perspective of the entire support provided.

A configuration management database (CMDB) is a database that contains all relevant information about the significant components of the IT environment and the relationships between those components. A CMDB helps an organization understand the relationships between these components and track their configuration. Components of an information system can be any conceivable IT component, including software, hardware, documentation, and personnel, as well as any combination of these.

The IT Infrastructure Library (ITIL) best practices standards include specifications for configuration management. One of the four major tasks of configuration management identified by the ITIL standards is verification, through audits and reviews of the data to ensure that it is accurate.

IT environments can include a policy-based management approach. A Policy-Based Management policy contains a condition and a target set. The condition can include one or combinations of rules, permissions, tasks to perform, exclusion of tasks, and data collection. The target set can be a server instance, a server object, a database, or a database object that is affected by the condition or an application hosted on a server, affected by the condition. In the computing world, policy-based management is used as an administrative tool throughout a business, organization or network that has multiple users. Policy based management typically addresses conditions that include controlling access to resources within the organization or network, and priorities for the use of the resources.

Policy definitions are a response to questions such as: Who and what can access which resources? What is the highest priority traffic, what is the lowest priority traffic, and what levels of traffic are in between? A policy-based management system allows administrators to define rules based on these types of questions and manage them in the policy system. These rules take the form of "if condition, then action."

For dynamic IT environments, managed service providers struggle to maintain consistency between the required infrastructure and services to be provided, as designated by a customer or client within a contract, and the actual deployed operations IT environment being managed.

BRIEF SUMMARY

Embodiments of the present invention disclose a method, computer program product and system for validating consistency between a policy-based service and operational data of a managed IT environment. One or more processors collect information for a component of a baseline, wherein the component of the baseline is at least one of an IT device and an application within the managed IT environment. One or more processors determine the policy-based service to be applied to the component of the baseline. One or more processors collect information to access operational data associated with a provider of the policy-based service. One or more processors generate a policy based on the information for the component of the baseline and the policy-based service to be applied to the component of the baseline, and one or more processors perform a validation of consistency based on a comparison between the policy and the operational data associated with the provider of the policy-based service.

DETAILED DESCRIPTION

Embodiments of the present invention recognize that the complexities of aligning the managed services of large IT environments to the dynamic IT needs as designated in a customer contract, seldom results in consistent compliance. Techniques used to setup and manage IT environments have improved, however, the monitoring and validation of the components and services of an IT environment, as designated within a contract, remains segmented, and lack an overall validation that all elements included in a contract are present and working properly. Embodiments of the present invention integrate the designated IT devices and services of a customer contract, as translated to policy statements, with the validation of one or a combination of: inventory, configuration, operational monitoring, tool and service functionality, and health check feedback, providing an end-to-end operational condition of the managed IT environment. Centralizing the status of the integrated environmental condition enables broad alert notification in which potential operational problems may be avoided, reduces the level of required support, and offers broad and targeted reporting opportunities to all levels of an organization or business.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
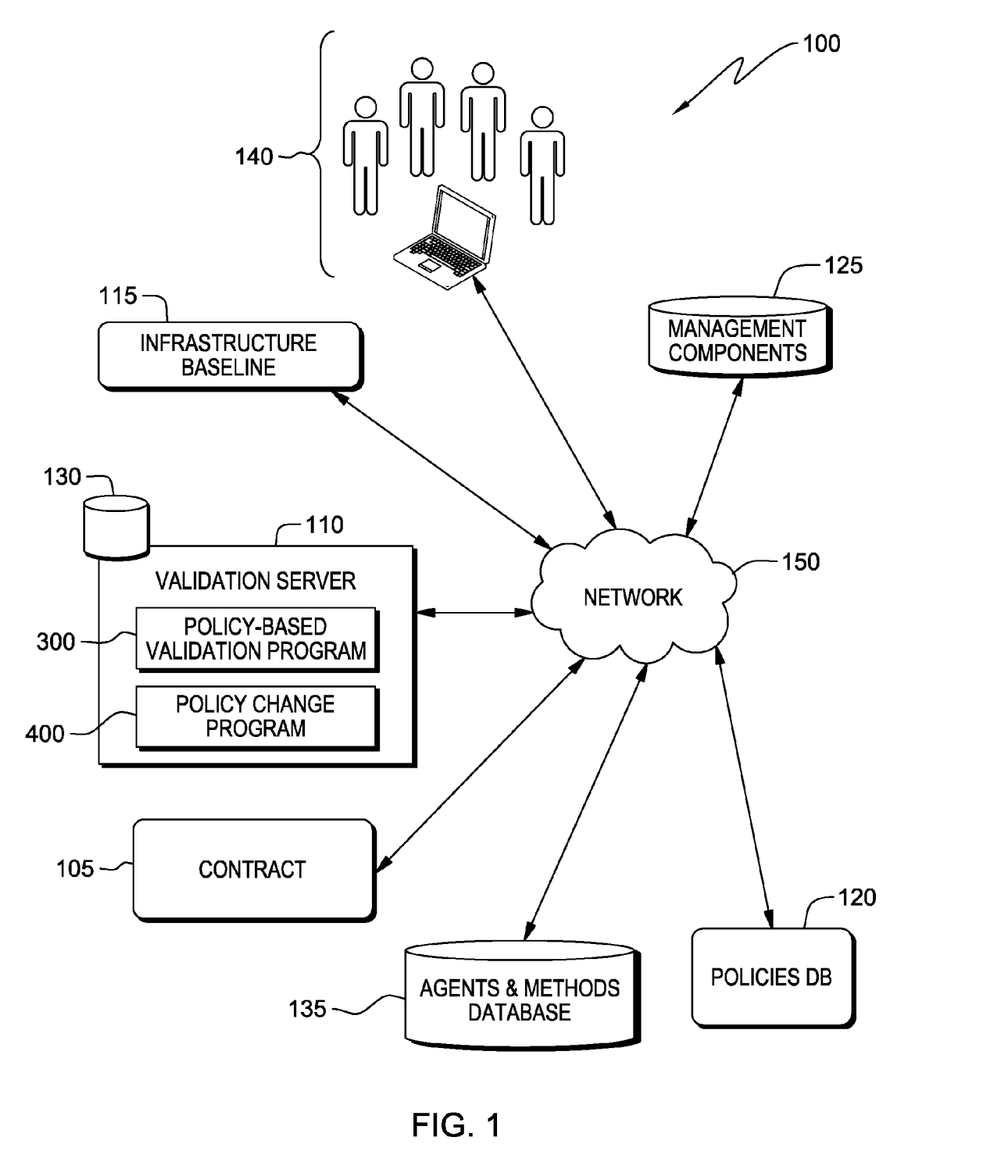
FIG. 1 is a functional block diagram illustrating a managed IT data processing environment, in accordance with an embodiment of the present invention.

FIG. 1 is a functional block diagram illustrating a managed IT data processing environment, generally designated 100, in accordance with one embodiment of the present invention. FIG. 1 includes infrastructure baseline 115, validation server 110, management components 125, consistency repository 130, contract 105, agents and methods database 135, policy database 120, and support personnel 140, all interconnected through network 150.

Network 150 can be, for example, a local area network (LAN), a wide area network (WAN) such as the Internet, or a combination of the two, and can include wireline or wireless connections. In general, network 150 can be any combination of connections and protocols that will support communications via various channels between validation server 110, contract 105, infrastructure baseline 115, policy database 120, management components 125, consistency repository 130, and support personnel 140, in accordance with an embodiment of the invention.

Support personnel 140 represents a group of people having overall responsibilities to manage IT data processing environment 100, and access to network 150 and the resources connected to network 150. Support personnel 140 responds to alerts or notifications to ensure the IT devices and services, as stipulated in the contract or service level agreement (SLA) for the management of the IT data processing environment 100, are met. Support personnel 140 are involved in information entry derived from the contract and used to develop and configure IT policies. Support personnel 140 are further responsible for deployment of the tools and agents used to provide the services as defined in the contract, which may involve sub-groups that specialize in specific services. Along with deploying the service providing tools, support personnel 140 also provides health check agents that correspond to and are deployed along with the service providing tools within the same device.

Contract 105 is the contract or service level agreement recognized by the customer receiving managed IT services and the provider of the managed IT services as including the required devices, services, and detailed conditions of the IT services to be provided. The conditions of the IT service provided include at least one of: the scope of service, the level of service and the frequency of service. Contract 105 is the definitive source of information for the IT devices and services to be managed by the provider and received by the customer/client. Embodiments of the present invention include service providing agreements between organizations and outsourced service providers as well as internal (same business or organizational entity) service providers. Contract 105 may be a formal written contract, a service level agreement or a document of understanding between organizations. In one embodiment of the present invention, contract 105 may include structured forms and consistent keywords, which when utilized offer a consistent format that facilitates software recognition of the devices, applications, services, level of service and frequency of service to be provided and managed.

Infrastructure baseline 115 includes the information for all the servers, storage devices, databases, network devices, and any other devices, as well as applications, specified within contract 105 for the customer of managed IT services. All items included in the determination of the baseline, such as infrastructure baseline 115, are considered components of the baseline. IT devices listed in the baseline, includes, at least in part, the following information: the hostname for the devices, the internet protocol (IP) address for the devices, the physical location of the devices, the operating system (OS) for the device, and applications and versions of applications deployed onto the devices. In some embodiments of the present invention, applications included in the baseline, which are deployed onto the IT devices, include tools and agents that perform specific functions within the IT environment. Infrastructure baseline 115 serves as an inventory of the devices and applications to be managed within the IT environment, as well as the information that identifies and locates the devices and applications. The information included in infrastructure 115 is used to develop the policies that define the service information to be provided and the devices to which the services apply.

Policy database 120 contains the policies that apply detailed level of information for policy-based services provided to the customer to fulfill the contract, which includes the customer designated IT devices, applications, services, and conditions of the services. A policy is derived from a contract and baseline, such as contract 105 and infrastructure baseline 115, linking the device and application inventory with the type, level, and frequency of services as well as service exceptions. Service exceptions are specific instances in which devices or applications are designated to not receive a service that is otherwise generally applied to all devices or applications, for example, if all servers for a customer are to be monitored, per the contract, designating server "A" to not be monitored is a service exception.

Management components 125 is a database that includes information regarding the operation and access of tools and agents for services. The tools included in management components 125 are specialized programs, modules and/or agents that perform, when properly installed and configured, the specific services on the devices of the managed IT environment to comply with the contract.

Consistency repository 130 stores results from validations performed by policy-based validation program 300 (FIG. 3), residing on validation server 110. The results from consistency validations include matching the contract designated IT devices and services as represented in the policies database (policy-based services), with the data received from health check monitoring data of deployed tools and agents providing services. Results stored in consistency repository 130 are used for reporting, history tracking, and notification purposes, and may include, for example, confirmation that all deployed tools and agents are working properly and are providing the correct service, service level, and frequency of service to the correct device, as necessary, within the managed IT environment. Similarly, consistency repository 130 may include results that indicate an agent is not working properly, or that an agent is missing from a managed device, or that an agent is deployed to the wrong device, for example. In one embodiment, consistency repository 130 is directly connected to or a component of validation server 110. In other embodiments (not shown) consistency repository 130 is connected to server 110 via network 150.

Agents and methods database 135 is a repository for the information associated with the tools/agents deployed to provide the contracted services (hereafter, the deployed software that functions to provide a service is referred to as an agent). Information stored in agents and methods database 135 is input during the setup and on-boarding process of a managed IT services customer. When agents, which are the implemented providers of the service, are deployed on devices within the managed IT environment by support personnel 140, corresponding health check tools are also deployed. The health check tools are software tools used to determine if the service providing agents are working properly, and key information to access the health check data is included in agents and methods database 135 during customer on-boarding.

Validation server 110 uses policy database 120 information, infrastructure baseline 115 information, and health check tool data to determine if the IT environment is being managed appropriately (i.e. per the contract). Validation server 110 hosts programs (e.g., policy based validation program 300 and policy change program 400) that operate similar to an expert system, receiving input, determining and generating policies, and validating the policies against actual operational data, to determine if the IT environment is being properly managed.

Validation server 110 may be a desktop computer, a laptop computer, a specialized computer server, a client computer, a tablet, a netbook personal computer (PC), a personal digital assistant (PDA), a smart phone, a mainframe computer, a web server computer, or a networked server computer. Further, validation server 110 can represent computing systems utilizing clustered computers and components to act as single pools of seamless resources when accessed through network 150, as is common in data centers and with cloud computing applications. In general, validation server 110 is representative of any programmable electronic device or combination of programmable electronic devices capable of executing machine-readable program instructions. Validation server 110 may include internal and external hardware components, as depicted and described in further detail with respect to FIG. 5.

Validation server 110 operates policy-based validation program 300, which generates policies from information within infrastructure baseline 115 and contract 105. Once policies are determined for the services to be provided for each device and application, policy-based validation program 300 stores the policy information in policy database 120. Policy database 120 includes details of the service to be provided, including the identity of the device to which the service applies, the level of service, and the frequency of service. Policy-based validation program 300 also matches the service to be provided, as stated in contract 105, to the listing of service agents in management components 125, for consistency. Policy-based validation program 300 additionally accesses health check tool data, which is operational data indicating if the deployed service providing agents are working properly, by using health check tool access information from agents and methods database 135.

Figure 3:
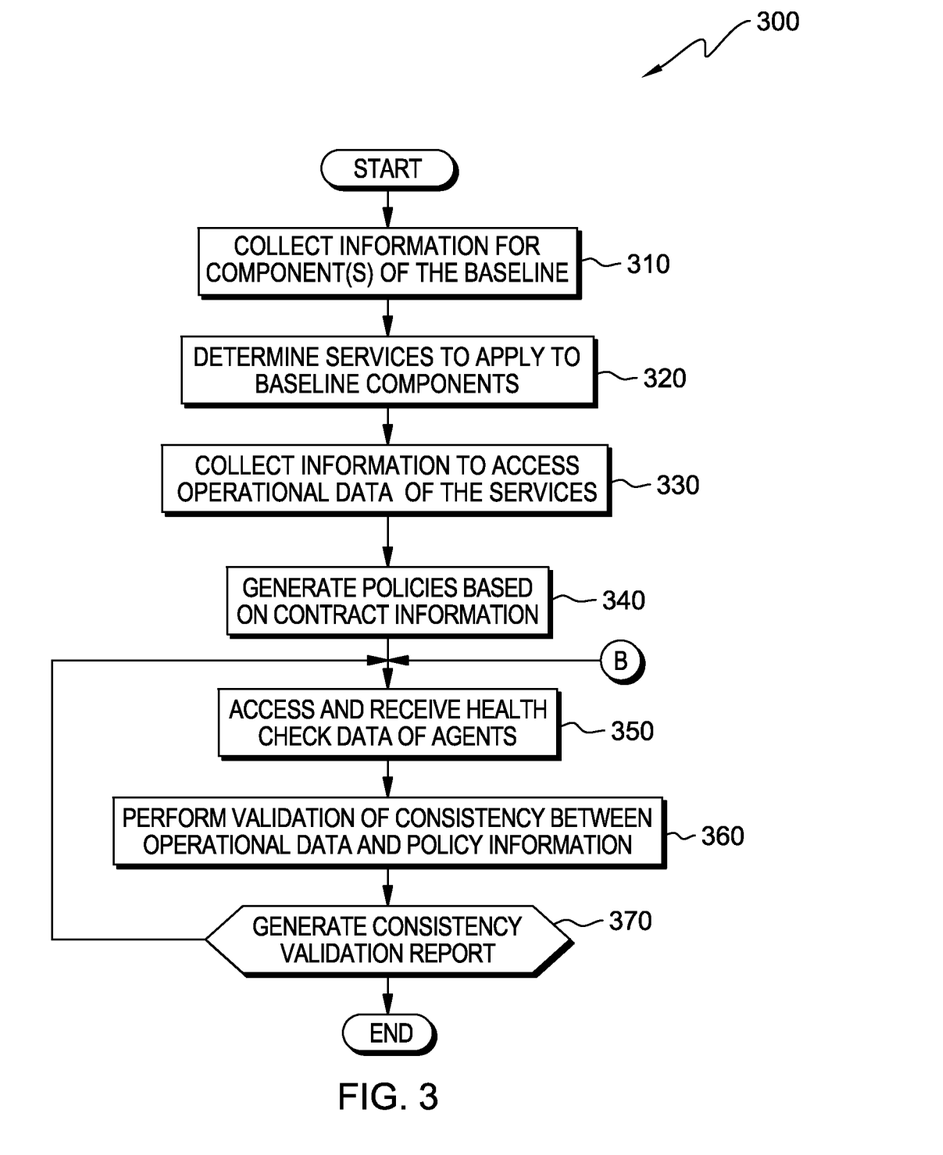
FIG. 3 is a flowchart depicting operational steps of a policy-based validation program, on a server computer within the managed IT data processing environment of FIG. 1, for validating the consistency of the operational environment to the contracted requirements, in accordance with an embodiment of the present invention.

The information collected by policy-based validation program 300 enables the construction of contract details in the form of policy definitions that are compared to actual operational data, thus validating consistency between services required and services provided, discussed further with respect to FIG. 3. Validation server 110 also includes and operates policy change program 400 which adjusts policies and baseline information based on changes to the IT environment being managed, discussed further with regard to FIG. 4.

In one embodiment of the present invention, validation server 110, operating policy-based validation program 300 and policy change program 400, access and compare data from multiple sources, to determine if the IT environment is managed according to contract 105. Validation server 110, operating policy-based validation program 300 and policy change program 400, obtain the identification of the devices and applications that are included in contract 105 and from infrastructure baseline 115, so that cross references for consistency with policy database 120 are performed, identifying the devices and applications to receive services, as well as the services as stated in the contract.

Figure 2:
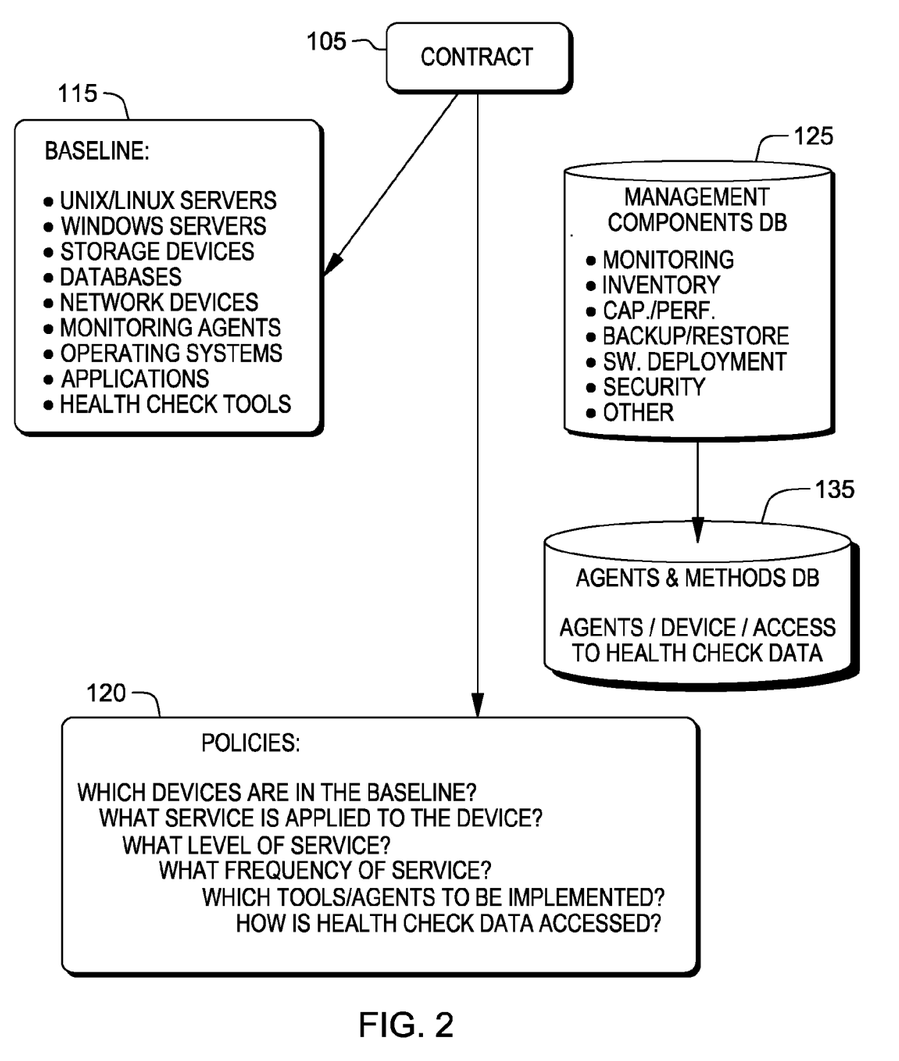
FIG. 2 is a block diagram depicting details of the managed IT environment components of FIG. 1, in accordance with an embodiment of the present invention.

FIG. 2 is a block diagram depicting details of the managed IT environment components of FIG. 1, in accordance with an embodiment of the present invention. Contract 105, as described above, includes the required devices, services, and detailed conditions of the services to be provided. In one embodiment, contract 105 is an electronic document capable of being analyzed and parsed by text-analyzing applications and natural language programming (NLP) techniques. In another embodiment, contract 105 is an electronic form with defined selectable entries.

Infrastructure baseline 115 is shown listing exemplary devices and applications that may be included in the managed IT environment. Infrastructure baseline 115 may include, but is not limited to: UNIX® (UNIX is a registered trademark of The Open Group)/Linux Servers® (Linux® is the registered trademark of Linus Torvalds in the U.S. and other countries), Windows® servers (Windows is a registered trademark of Microsoft Inc. in the U.S. and other countries), storage devices, databases, network devices, monitoring agents, health check tools, operating system applications, and other applications.

Management components 125 is shown listing an exemplary, non-exhaustive, set of service providing agents, that includes: various monitoring services, inventory, capacity monitoring, performance monitoring, backup & restore, software update and deployment, security services, OS agent, patching agents, incident-problem-change management (IPC), and other services. Services are provided by use of an agent installed on the device designated to receive the service, and a corresponding program, or "corresponding tool" that resides on a centralized server of the service provider. The tool and agent work together to provide the service and store or act on the results of the provided service. For example, a data backup service agent initiates the backup process on the device within the managed IT environment, and sends the backup data to be stored on a server of the service provider.

Agents and methods database 135 is a repository for the information associated with the agents deployed to provide the contracted services. During setup and on-boarding, or when changes are made to the baseline of a managed IT services customer, the information associated with the deployment of service providing agents onto managed devices is received by agents and methods database 135. The information includes, at least in part, hostname of the device, internet protocol (IP) address, physical location, identification of the agent installed, additional details associated with the service provided by the agent (such as level of service and frequency of service, for example). When service providing agents are deployed on managed devices, corresponding health check tools are additionally deployed on the devices. Agents and methods database 135 includes the service agent deployed and the information for accessing the corresponding health check tool, in regards to validating tasks performed by the agent.

The health check tools provide data indicating whether the agents deployed within the managed IT environment, providing services according to the policy information in policy database 120, are working properly. Health check tools are software programs that perform monitoring or checks on service providing agents deployed on devices within the managed IT environment. Health check tools collect data regarding the deployed agent that may include, but are not limited to: identifying the device on which the agents are performing checks, determining if the agents on the device are actively operating, determining if the agents are collecting data, determining if the agents are executing instructions, and determining if the agents are connecting to at least one server that receives data in support of the health check activity.

The health check data is used to validate that the agents providing services, as defined in policy database 120, are deployed to the correct device, working properly, and are providing the correct level and frequency of service.

Policy database 120 includes the policies defining the services and conditions to be applied to the in-scope devices and applications, as stated within contract 105. Policy database 120 is shown listing questions regarding the type of information used to generate policies for managed IT services. Policy database 120 is a reiteration of contract 105, in terms of defining specific devices, applications, services associated with each device or application, and the conditions associated with the services. The services applied to a managed IT environment, resulting from policies that are based on baseline components and contract designations, may be referred to as policy-based services. A non-exhaustive list of examples of services to be provided for devices within the scope of a managed IT services contract include: access monitoring, application monitoring, inventory verification, capacity utilization, performance utilization, data backup/restore, software update, security, and event correlation.

Policies may be categorized into global policies, customer-specific policies, and restrictive policies. Global policies generally apply to all devices of a particular type across all customer sets. For example a global policy may be, "all UNIX® servers (UNIX is a registered trademark of The Open Group) must be continually monitored". Other global policy examples may include, "all Windows® (Windows is a registered trademark of Microsoft Inc. in the U.S. and other countries) servers must have a monitoring agent deployed to monitor the OS", "all servers must scan for software licenses", and "all databases must have incremental backed-ups performed daily".

A customer-specific policy may include the case in which a global policy is not enforced on a customer-specific set of devices. An example of this type of customer-specific policy may be, "Windows® servers for Customer A do not require a monitoring agent deployed to monitor the OS". Another example of a customer-specific policy may be, "Customer B servers require a full antivirus scan daily". Restrictive policies are specific to devices or applications and require either the performance of a service that is not performed globally or on all similar-type customer devices, or the exclusion of a global or customer-specific service on a specific device. An example of a restrictive policy may be, "Server X for Customer A must not be monitored".

FIG. 3 is a flowchart depicting operational steps of policy-based validation program 300, on a server computer within the managed IT data processing environment of FIG. 1, in accordance with an embodiment of the present invention. Policy-based validation program 300 uses information based on the contract of a managed IT services customer to construct a profile of the devices and applications receiving services, including the level and frequency of the services, for the managed IT data processing environment. Further, policy-based validation program 300 performs a consistency validation between the agents providing the services that are deployed to the designated devices within the managed IT services environment, and the constructed profile, thereby validating that the IT environment is managed according to the contract.

Policy-based validation program 300 collects information for components of the baseline (step 310). In one embodiment of the present invention, the devices to be included in the scope of the managed IT services contract are identified by support personnel 140 providing input directly to infrastructure baseline 115. The information for a component of the baseline includes at least one of: the device hostname, IP address, physical location, operating system (OS), and applications deployed on the device. Typically, support personnel 140 provides this information during the initial engagement of setting up the customer for the managed IT services to be provided. Policy-based validation program 300 collects the baseline component information from entries made by support personnel 140, such as from entries made to infrastructure baseline 115. In another embodiment, policy-based validation program 300 utilizes natural language programming (NLP) techniques, keyword dictionaries and device/application libraries to identify the devices from the information designated within the contract. NLP techniques are used to parse the text of the managed IT service contract, and identify and categorize the text into parts of speech. Additional use of dictionary lookup tables assist in identifying device types included in the text of the contract. Use of NLP techniques combined with a dictionary of terms and lookup tables for matching specified devices, enables policy-based validation program 300 to determine the baseline scope identified within the contract. In other embodiments, contracts may include structured field-specific forms to facilitate determination of baseline devices, services, and details of services to be provided.

Policy-based validation program 300 determines the policy-based services to apply to each baseline component based on the contract (step 320). For example, in one embodiment of the present invention, support personnel 140 inputs the services to be provided for each device identified as part of the scope of managed IT services, per the contract. For each device that is to be supported by the managed IT services, the specific service, service level, if applicable, frequency of service to be provided, and other applicable service conditions, are entered into policy database 120. In another embodiment, policy-based validation program 300 uses NLP techniques, lookup tables and a keyword dictionary that include entries to facilitate matching services offered, service levels, frequency intervals, and other details, to the customer's designation within the text of the contract. Policy-based validation program 300 stores formatted information for the provided services, service levels, frequency interval of service and additional details, in policy database 120.

Using the information defining the services to be provided from entries made by support personnel 140 or alternatively by policy-based validation program 300 determining the customer designated services from the contract, policy-based validation program 300 collects information to access operational data of the services (step 330). The available software agents, which are the providers of the services, are included in management components 125 (FIG. 2). Policy-based validation program 300 matches each service to be provided, to a corresponding agent in management components 125. Included in management components 125 is the information to access the operational data associated with each agent. The agents, when installed and properly configured, will provide the required service and conditions of the service, as stipulated in the contract and detailed in the policies of policy database 120. Accessing the operational data associated with each agent provides feedback indicating if the agent is deployed correctly and working properly.

For example, a contract that designates the need for a service to perform daily data backup on all databases and selected servers, results in policy-based validation program 300 matching a "data backup" service to the "backup/restore" agent in management component 125. Policy-based validation program 300 determines the databases and servers receiving the service from infrastructure baseline 115 and the service and conditions of the service from policy database 120. Policy-based validation program 300 collects the information to access the operational data for each instance of "backup/restore" agents deployed on the databases and selected servers of managed IT data processing environment 100. Using the information to access the operational data, policy-based validation program 300 is able to obtain feedback indicating if the agents are working properly.

Assembling the information acquired from the input by support personnel 140, or in a preferred embodiment, information acquired by NLP techniques and lookup table references, policy-based validation program 300 generates policies based on contract information (step 340). Policy-based validation program 300 matches the baseline device and application information with the service(s) to be provided (or excluded) for the device, including the service level, frequency and other service details. Additionally policy-based validation program 300 links the agent that provides the service, to the device or application to which the service is applied. Policy-based validation program 300 combines and organizes the information for all devices and services identified within contract 105 to generate policies that define the managed services to be applied to the IT environment. Each policy describes one or more devices or applications, a service to be performed (or excluded), and conditions of performing the service.

The service providing agents are deployed by support personnel 140, based on the services, scope and service conditions, as stated in the contract. The information associated with the deployment of the services and details of how to obtain operational data from the services, is input by support personnel 140 into agents and methods database 135. The information includes the device on which the agent is deployed, details of how operational data from the agent can be accessed, and additional details associated with the proper operation of the agent providing the service.

To confirm the service providing agents are accurately deployed and working properly, policy-based validation program 300 accesses and receives health check data of the agents (step 350). Policy-based program 300 accesses the information stored in agents and methods database 135 which includes details to access the operational data from the deployed agents providing services. Health check tools are deployed in conjunction with the deployment of service providing agents, by support personnel 140.

In one embodiment of the present invention, support personnel 140 deploy service providing agents as designated in the contract, on devices identified and entered into infrastructure baseline 115. Support personnel 140 additionally deploy health check tools that correspond to the deployed agents. Policy-based validation program 300 applies the operational data access information from agent and methods database 135, to each health check tool corresponding to a deployed service providing agent. Through the health check tools, policy-based validation program 300 accesses the operational data and obtains feedback on whether each service providing agent is correctly deployed and working properly.

For example, support personnel 140 deploys monitors on two selected servers within an IT environment, such as managed IT data processing environment 100. The monitors are agents that provide a service to track the CPU utilization levels of the server processors, for example, sending data back to a collection application on a support personnel 140 server. Support personnel 140 also installs health check tools on the two servers that are configured to detect the monitoring of the agents and the transmission of the CPU utilization operational data back to the collection application. The health check tools send data regarding the activity of the monitoring agents, to a monitoring application on a server maintained by support personnel 140, to which policy-based validation program 300 has access. Policy-based validation program 300 receives the health check tool data and determines if the monitoring agents are working as specified per the policies for the monitored servers in policy database 120. The policies are generated from contract 105, such that policy-based validation program 300 validates that the managed IT data processing environment is operating per the designations of the contract with customer.

Having the baseline scope of devices and applications, the agents and the operational feedback, policy-based validation program 300 performs a validation of consistency between operational data and policy information (step 360). The policy information is based on the contract, the baseline and the deployed agents providing services. The operational feedback includes data from the health check tools that indicates if each deployed agent is on the correct device, running, collecting data, executing instructions, and connecting to other devices as intended.

For example, policies for Customer A state that "all servers must be backed up every other day", and "server X must have backup performed every day". Policy-based validation program 300 accesses infrastructure baseline 115 to determine the servers that are in scope as defined by contract 105. Policy-based validation program 300 links the backup service agent to all in-scope servers at a frequency of one backup performed every other day, with the exception that server X must have backup performed every day. Policy-based validation program 300 validates the consistency between the policy expectations and the operational data obtained from health check tool data. For each server in scope of the managed IT services, a validation that a log record of backup exists within the past 48 hours, and for server X, a backup log record entry exists within the previous 24 hours.

Policy-based validation program 300 also validates that the operational data indicated the correct service is being performed on the correct device and at the correct level and frequency. If the operational data matches the information within the policies, policy-based validation program 300 indicates a validated conforming condition and records the result for reporting purposes. If the operational data does not match the policy expectations, a non-conforming alert results, and is similarly recorded for reporting and awareness.

After a managed IT services customer is through the on-boarding process and policies have been generated, culminating in an initial performance of a validation of consistency, policy-based validation program 300 generates a validation of consistency report (370). In one embodiment of the present invention, policy-based validation program 300 outputs the results of the validation of consistency report to a real-time dashboard display. The dashboard is available to support personnel 140 to provide immediate awareness of conformance or non-conformance between the operational feedback data of provided services, and the expected service based on contract 105 and further detailed in policy database 120. In other embodiments, the results of the validation of consistency may be reported in a document that can be accessed or distributed, included on a web page, or distributed by other communications media. In still other embodiments, alerts of non-conformance may be sent as a short message service (SMS) text message to support personnel 140, such that immediate awareness may expedite corrective actions. Distributing or displaying the real-time results for the validation of consistency for the managed services enables all levels of support personnel 140 and appropriate customer clientele, to be fully aware of compliance or non-compliance conditions, and respond accordingly.

In one embodiment of the present invention, policy-based validation program 300 continually operates on a pre-determined schedule, performing a validation of consistency of services provided on a specific time interval. In another embodiment, policy-based validation program 300 performs a validation of consistency on a manually initiated basis. After generating a validation of consistency report, policy-based validation program 300 accesses and receives new health check data from the deployed tools (step 350) and continues as described above.

Figure 4:
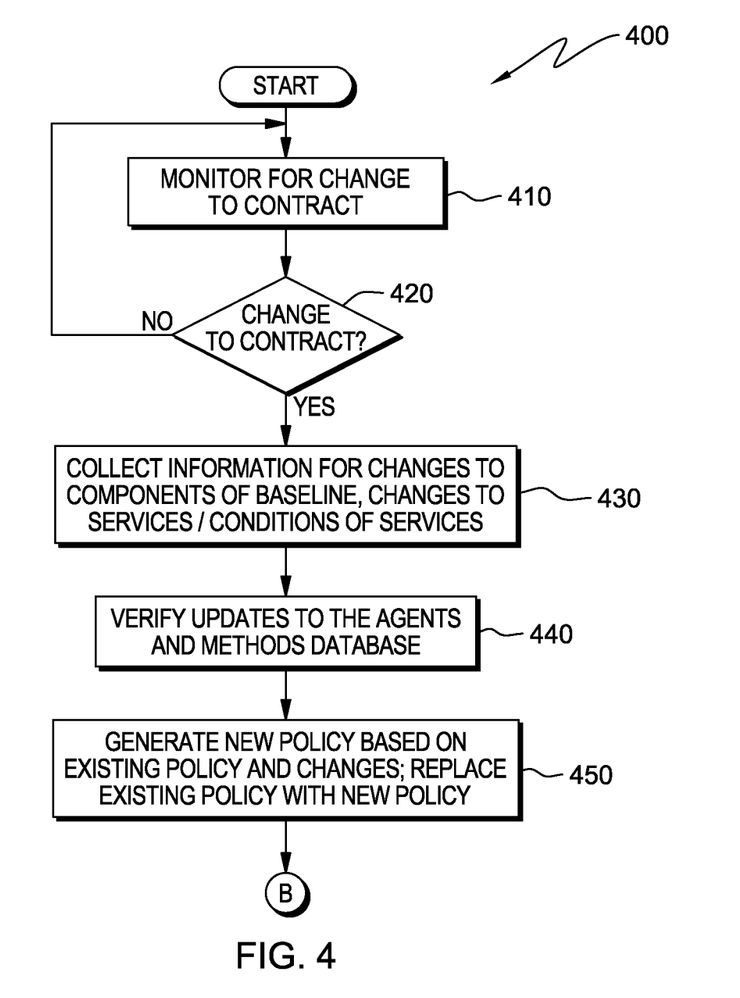
FIG. 4 illustrates operational steps of a policy change program, introducing a change to devices, applications or services within the contract scope of managed IT data processing environment of FIG. 1, in accordance with an embodiment of the present invention.

FIG. 4 illustrates operational steps of policy change program 400, introducing a change to devices, applications or services within the contract scope of managed IT data processing environment of FIG. 1, in accordance with an embodiment of the present invention. Policy change program 400 monitors for a change made to contract 105. Embodiments of the present invention may include multiple policies, each of which may apply to individual devices, applications or services. The multiple policies are hereafter collectively referred to as the policy, for convenience, and the current policy is referred to as the "existing" policy. Generation of a subsequent policy is referred to as a second policy or "new" policy.

Policy change program 400 re-generates policies based on the information changing the scope of contract 105, for the IT data processing environment being managed.

Policy change program 400 monitors for a change to contract 105 (step 410). Changes to the managed IT services are documented in contract 105 by support personnel 140. Policy change program 400 monitors contract 105 at a pre-defined frequency to determine if a change has been made. Policy change program 400 compares the current content of contract 105 to the content of contract 105 that was used to generate the current policies stored in policy database 120, to determine if a change has been made to the contract. Although policy change program 400 may continuously monitor for contract changes, monitoring once within a designated period, for example, every 12 hours, for example, may be adequate. Determining that no change has been made to the contract (step 420, "NO" branch), policy change program 400 continues to monitor for changes.

Having determined that a change to the contract has been made (step 420, "YES" branch), policy change program 400 proceeds to collect information for changes to components of the baseline, changes to services and/or conditions of the services (step 430). Changes to managed IT data processing environment 100 are documented in contract 105 and device and/or application changes are further included in updates to infrastructure baseline 115, by support personnel 140. Policy change program 400 accesses infrastructure baseline 115 and collects information for changes to the components of the baseline. Changes to the components of the baseline may include one or a combination of: additional devices, additional applications, removal of devices, and removal of applications.

For example, contract 105 is changed by adding an additional server (server Z). Support personnel 140 updates contract 105 and infrastructure baseline 115 to include server Z. Policy change program 400 identifies the change to contract 105 and infrastructure baseline 115 and determines, by use of keyword, key-phrase and NLP techniques, the changes to devices and/or applications. Alternatively, in a different embodiment, policy change program 400 may use a structured electronic contract format with listings from which devices may be added or removed by selection. Policy change program 400 determines the changes to the policy based on the changes made to the components of the baseline, from the structured electronic contract selections received.

Policy change program 400 also collects information from changes to services and/or conditions of services. For example, policy change program 400 determines from changes to contract 105 that an additional service is added to the additional server, such that "server Z must have continuous monitoring of the CPU performance". The example results in an additional server (server Z), added to the baseline, an additional service (CPU performance monitoring), applied to the additional server, and a condition of the service to monitor the CPU performance (continuous monitoring).

Having determined the changes to the baseline and services, policy change program 400 verifies updates to the agents and methods database (step 440). To perform validation of consistency between the policy expectations of managed services and the operational data, policy change program 400 verifies that updates have been made to agents and methods database 135, including information for access to the health check data providing feedback on the operation of the changes made to policy database 120. In the example embodiment, responding to the addition of server Z that requires a service to continuously monitor CPU performance, policy change program 400 verifies in agents and methods database 135 that the agent for monitoring CPU performance is deployed and that the information for access to the health check data for the agent is available.

Having determined the changes to the components of the baseline and the services to be applied to the components of the baseline, as well as any conditions to be applied to the services, policy change program 400 generates a second policy (in this case a new policy), based on the existing policy and the changes made to the existing policy as documented in contract 105, and replaces the existing policy with the new policy (step 450).

Policy change program 400 makes adjustments to the information regarding the components of the baseline and information regarding the service(s) to be provided (or excluded) for the components of the baseline, including the conditions of the service. Additionally, policy change program 400 updates any changes to the association of an agent that provides a service, to the device or application to which the service is applied. Policy change program 400 combines and organizes the information for all devices and services included within the changes to contract 105 and generates a new policy (a second policy) that becomes the new definition of the devices and services to be applied to the managed IT environment, and replaces the existing policy.

In one embodiment, the generation of a new policy is done by policy change program 400 calling a module of policy-based validation program 300, and passing information regarding changes to the components of the baseline and changes to the services to be applied to components of the baseline, as determined from the changes made to the contract. The new policy generation is completed by the module of policy-based validation program 300, replacing the previously existing policy in policy database 120 and returning control to policy-based validation program 300 at "B" (step 350). In another embodiment, policy change program 400 includes processing instructions to complete the generation of the new policy, based on the existing policy and changes made to the existing policy, as determined by the changes made to the contract. After completing the generation of the new policy, policy change program 400 replaces the previously existing policy in policy database 120 and returns control to policy-based validation program 300 at "B" (step 350).

Policy change program 400 transfers control to policy-based validation program 300 at "B", (step 340, FIG. 3), at which point the policies are regenerated based on the changes made to the contract information, and the new policy replaces the current existing policy and are stored in policy database 120. Policy-based validation program 300 proceeds as described above.

Figure 5:
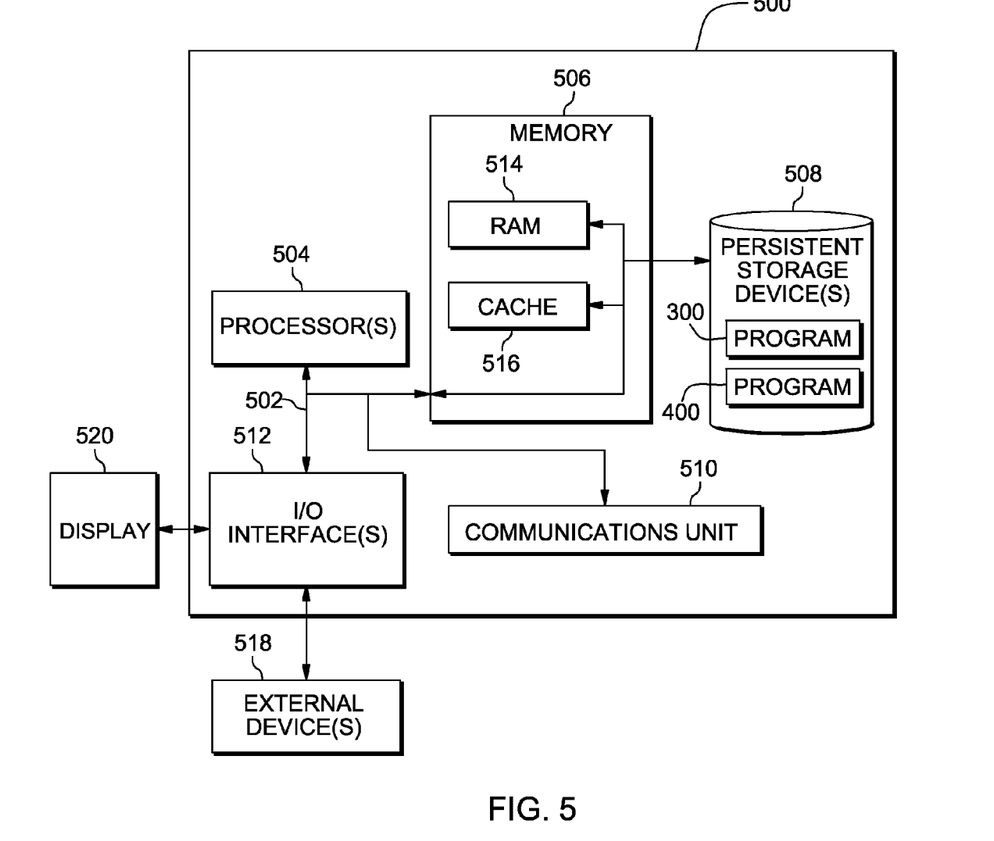
FIG. 5 depicts a block diagram of components of the proxy server computer executing the intelligent mapping program, in accordance with an embodiment of the present invention.

FIG. 5 depicts a block diagram of components of server computer 500 capable of executing policy-based validation program 300 and policy change program 400, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Policy-based validation program 300 and policy change program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of managed IT data processing environment 100, such as contract 105, validation server 110, consistency repository 130, policy database 120, infrastructure baseline 115, management components 125, and agents and methods database 135. In these examples, communications unit 510 includes one or more network interface cards. Communications unit 510 may provide communications through the use of either or both physical and wireless communications links. Policy-based validation program 300 and policy change program 400 may be downloaded to persistent storage 508 through communications unit 510.

I/O interface(s) 512 allows for input and output of data with other devices that may be connected to validation server 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., policy-based validation program 300 and policy change program 400, can be stored on such portable computer-readable storage media and can be loaded onto persistent storage 508 via I/O interface(s) 512. I/O interface(s) 512 also connects to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for validating consistency between one or more services that are provided and operational data of a managed information technology environment, the method comprising:

receiving, by one or more processors, content of a contract that designates one or more services to be provided to each of one or more components of a baseline within a managed information technology environment;

receiving, by one or more processors, information that describes the one or more components of the baseline, wherein the one or more components of the baseline are at least one of an information technology device, and an application operating on an information technology device, within the managed information technology environment;

receiving by the one or more processors, operational data associated with the one or more services that are provided and are applied respectively to the one or more components of the baseline;

generating, by one or more processors, a policy that is currently utilized, based on the information identifying the one or more components of the baseline, and the one or more services that are provided according to the content of the contract, wherein the generated policy includes conditions of a level of service and a frequency of service for the one or more services, and links the one or more services respectively applied to each of the one or more components of the baseline;

in response to determining a change to the contract of the one or more components of the baseline within the managed information technology environment:
  receiving, by one or more processors, information defining the change made to the contract regarding conditions of the one or more services to be respectively applied to the one or more components of the baseline, and information to access the operational data associated with the one or more services that are provided;
  generating, by the one or more processors, a second policy based on the policy that is currently utilized and the information defining the change made to the contract; and
  replacing, by the one or more processors, the policy that is currently utilized with the second policy, and adjusting the one or more services that are provided, based on the second policy, wherein the second policy becomes the policy that is currently utilized;

determining by one or more processors, a validation of consistency by performing a comparison between the policy that is currently utilized, which links a particular service of the one or more services that are provided and expected to be applied to a particular component of the one or more components of the baseline, and the operational data associated with the one or more services that are provided and are applied, respectively, to the one or more components of the baseline; and generating, by one or more processors, to a real-time dashboard display of a computing device of the managed integrated technology environment, a report validating consistency between the operational data associated with the one or more services that are provided and the one or more services as designated in the policy that is currently utilized.

2. The method of claim 1, wherein generating, by one or more processors, the policy that is currently utilized is based on information including at least: an identity of each of the one or more components of the baseline, a location of each of the one or more components of the baseline, a service of the one or more services that are provided to be applied to a component of the one or more components of the baseline, and conditions of the one or more services that are provided to be applied to the one or more components of the baseline.

3. The method of claim 1, wherein collecting, by one or more processors, information for a component of a baseline, further comprises the step of collecting information that includes at least one of: a hostname, an IP address, a location, an operating system (OS) and applications deployed on the IT device.

4. The method of claim 1, wherein determining, by the one or more processors, the one or more services that are provided and are applied to the one or more components of the baseline, further includes collecting information of a condition associated with the one or more services that are provided, wherein the condition includes in part, at least one of: a level of the policy that is currently utilized service applied to the one or more components of the baseline and a frequency of the one or more services that are provided and applied to the one or more components of the baseline.

5. The method of claim 1, wherein determining, by the one or more processors, a validation of consistency by performing a comparison between the policy that is currently utilized and the operational data associated with the one or more services that are provided for the managed IT environment, further comprises:
  in response to the validation of consistency indicating a difference between the policy that is currently utilized and the operational data associated with the one or more services that are provided, one or more processors generating an alert.

6. The method of claim 1, wherein receiving, by one or more processors, operational data associated with the one or more services that are provided and are applied to the one or more components of the baseline, further comprises:
  receiving, by the one or more processors, from a set of health-check tools the operational data associated with the one or more services that are provided, wherein the operational data from the set of health-check tools indicates whether the one or more services that are provided are working properly.

7. A computer program product for validating consistency between one or more services that are provided and operational data of a managed information technology environment, the computer program product comprising:
  one or more computer-readable tangible storage devices and program instructions stored on at least one of the one or more tangible storage devices, the program instructions comprising:
  program instructions to receive content of a contract that designates one or more services to be provided to each of one or more components of a baseline within a managed information technology environment;
    program instructions to receive information that describes the one or more components of the baseline, wherein the one or more components of the baseline are at least one of an information technology device and an application operating on an information technology device, within the managed IT environment;
  program instructions to receive operational data associated with the one or more services that are provided and are applied respectively to the one or more components of the baseline;
  program instructions to generate a policy that is currently utilized, based on the information identifying the one or more components of the baseline, and the one or more services that are provided according to the content of the contract, wherein the generated policy includes conditions of a level of service and a frequency of service for the one or more services, and links the one or more services respectively applied to the one or more components of the baseline;

in response to determining a change to the contract of the one or more components of the baseline within the managed information technology environment:

program instructions to receive information defining the change made to the contract regarding conditions of the one or more services to be respectively provided to the one or more components of the baseline, and information to access the operational data associated with the one or more services that are provided;

program instructions to generate a second policy based on the policy that is currently utilized and the information defining the change made to the contract; and program instructions to replace the policy that is currently utilized with the second policy, and adjusting the one or more services that are provided, based on the second policy, wherein the second policy becomes the policy that is currently utilized;

program instructions to determine a validation of consistency by performing a comparison between the policy that is currently utilized, which links a particular service of the one or more services that are provided and expected to be applied to a particular component of the one or more components of the baseline, and the operational data associated with the one or more services that are provided and are applied, respectively, to the one or more components of the baseline; and program instructions to generate to a real-time dashboard display of a computing device of the managed integrated technology environment, a report validating consistency between the operational data associated with the one or more services that are provided and the one or more services as designated in the policy that is currently utilized.

8. The computer program product of claim 7, wherein program instructions to generate the policy that is currently utilized is based on information at least including: an identity of each of the one or more components of the baseline, a location of each of the one or more components of the baseline, a service of the one or more services that are provided to be applied to a component of the one or more components of the baseline, and conditions of the one or more services that are provided to be applied to the one or more components of the baseline.

9. The computer program product of claim 7, wherein collecting information for a component of a baseline, further comprises the step of program instructions to collect information that includes at least one of: a hostname, an IP address, a location, an operating system (OS) and applications deployed on the IT devices.

10. The computer program product of claim 7, wherein program instructions to determine the one or more services that are provided and are applied to the one or more components of the baseline, further includes collecting information of a condition associated with the one or more services that are provided, wherein the condition includes in part, at least one of: a level of the policy-based service applied to the one or more components of the baseline, and a frequency of the one or more services that are provided and applied to the one or more components of the baseline.

11. The computer program product of claim 7, wherein program instructions to determine a validation of consistency by performing a comparison between the policy that is currently utilized and the operational data associated with the one or more services that are provided for the managed IT environment, further comprises:

in response to the validation of consistency indicating a difference between the policy that is currently utilized and the operational data associated with the one or more services that are provided program instructions to generate an alert.

12. The computer program product of claim 7, wherein program instructions to receive the operational data associated with an agent of the one or more services that are provided and are applied to the one or more components of the baseline, further comprises:

program instructions to receive from a set of health-check tools the operational data associated with the one or more services that are provided, wherein the operational data from the set of health-check tools indicates whether the one or more services that are provided are is working properly.

13. A computer system for, validating consistency between one or more services that are provided and operational data of a managed information technology environment, the computer system comprising:

one or more computer processors;

one or more computer-readable storage medium(s);

program instructions to receive content of a contract that designates one or more services to be provided to each of one or more components of a baseline within a managed information technology environment;

program instructions to receive information that describes the one or more components of the baseline, wherein the one or more components of the baseline are at least one of an information technology device and an application operating on an information technology device, within the managed IT environment;

program instructions to receive operational data associated with the one or more services that are provided and are applied respectively to the one or more components of the baseline;

program instructions to generate a policy that is currently utilized, based on the information identifying the one or more components of the baseline, and the one or more services that are provided according to the content of the contract, wherein the generated policy that is current includes conditions of a level of service and a frequency of service for the one or more services, and links the one or more services respectively applied to each of the one or more components of the baseline;

in response to determining a change to the contract of the one or more components of the baseline within the managed information technology environment:

program instructions to receive information defining the change made to the contract regarding conditions of the one or more services to be respectively applied to the one or more components of the baseline, and information to access the operational data associated with the one or more services that are provided;

program instructions to generate second policy based on the policy that is currently utilized and the information defining the change made to the contract; and program instructions to replace the policy that is currently utilized with the second policy, and adjusting the one or more services that are provided, based on the second policy, wherein the second policy becomes the policy that is currently utilized;

program instructions to determine a validation of consistency by performing a comparison between the policy that is currently utilized, which links a particular service of the one or more services that are provided and expected to be applied to a particular component of the one or more components of the baseline, and the operational data associated with the one or more services that are provided and are applied, respectively, to the one or more components of the baseline; and generating, by one or more processors, to a real-time dashboard display of a computing device of the managed integrated technology environment, a report validating consistency between the operational data associated with the one or more services that are provided and the expected services as designated in the policy that is currently utilized.

14. The computer system of claim 13, wherein program instructions to generate the policy that is currently utilized is based on information at least including: an identity of each of the one or more components of the baseline, a location of each of the one or more components of the baseline, a service of the one or more services that are provided to be applied to a component of the one or more components of the baseline, and conditions of the one or more services that are provided to be applied to the one or more components of the baseline.

15. The method of claim 1, wherein information associated with the one or more services that are provided to each of one or more components of the baseline within a managed information technology environment are determined by applying natural language processing (NLP) techniques to text of the content of the contract that is received.

16. The computer program product of claim 7, wherein information associated with the one or more services that are provided to each of one or more components of the baseline within a managed information technology environment are determined by applying natural language processing (NLP) techniques to text of the content of the contract that is received.

17. The computer system of claim 13, wherein information associated with the one or more services that are provided to each of one or more components of the baseline within a managed information technology environment are determined by applying natural language processing (NLP) techniques to text of the content of the contract that is received.

18. The method of claim 1, wherein the change made to the contract includes a change to one or a combination from a group comprised of: the one or more components of the baseline, and the one or more services that are provided to be applied, respectively, to the one or more components of the baseline.

19. The computer program product of claim 7, wherein the change made to the contract includes a change to one or a combination from a group comprised of: the one or more components of the baseline, and the one or more services that are provided to be applied, respectively, to the one or more components of the baseline.

20. The computer system of claim 13, wherein the change made to the contract include a change to one or a combination from a group comprised of: the one or more components of the baseline, and the one or more services that are provided to be applied, respectively, to the one or more components of the baseline.

* * * * *